Nov. 12, 1946.  C. HUETTEN  2,410,974

VIBRATOR CIRCUIT

Filed May 7, 1943

INVENTOR.
Clarence Huetten
BY Robbin + Carlson
ATTORNEYS

Patented Nov. 12, 1946

2,410,974

UNITED STATES PATENT OFFICE 2,410,974

VIBRATOR CIRCUIT

Clarence Huetten, Indianapolis, Ind., assignor to P. R. Mallory & Co., Inc., Indianapolis, Ind., a corporation of Delaware Application May 7, 1943, Serial No. 485,976

13 Claims. (Cl. 171—97)

This invention relates to vibratory interrupter circuits.

An object of the invention is to improve vibrator circuits.

Other objects of the invention will be apparent from the description and claims.

Vibrator circuits are often used to convert electric current from a low voltage source such as a battery to high voltage alternating current which may, if desired, be rectified to produce high voltage direct current for radio sets, electronic apparatus, and various applications. Heretofore, the vibrator circuits have generally been used to provide only relatively small high voltage currents.

It is desirable in some cases, however, to obtain heavier currents and some efforts have been made to produce "heavy duty" vibrator circuits to supply this need. In the past such arrangements have generally been based upon the use of a split reed arrangement or mechanical coupling of electric contacts driven by an electromagnet. Such assemblies are difficult to manufacture and maintain in adjustment and have not proven entirely satisfactory.

The present invention contemplates two or more mechanically independent vibrator units connected together in an electric circuit whereby operation of one of the units will control operation of the remainder.

Figure 1:
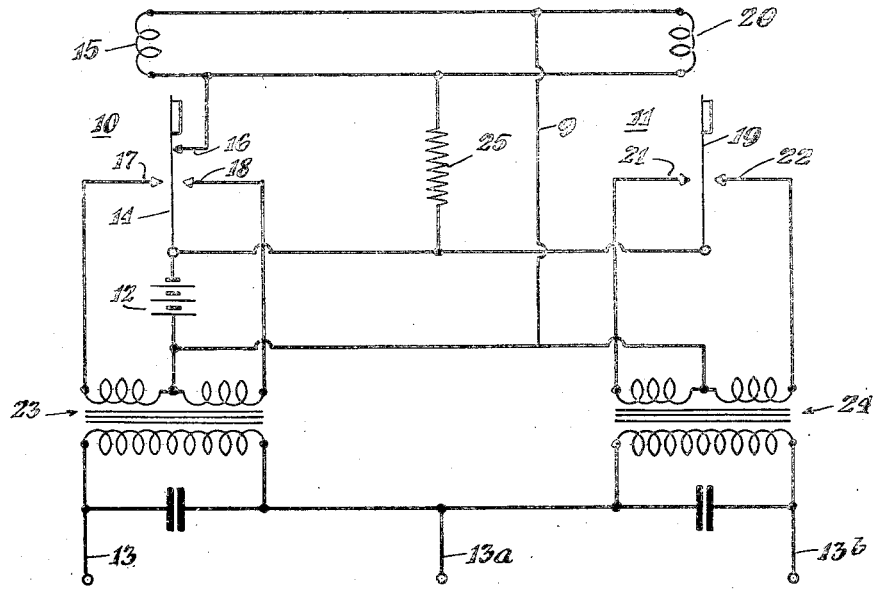
Figure 1 is a diagram of a vibrator circuit embodying features of the present invention.

Referring to the drawing, Figure 1 illustrates one embodiment of the invention utilizing two vibrators for producing a two-phase alternating current output in a three wire output circuit.

The circuit comprises a driving vibrator 10 and a driven vibrator 11 for converting low voltage direct current from battery 12 into two-phase high voltage alternating current in three wire output circuit 13, 13a, 13b. Vibrator 10 comprises a vibratory reed 14 driven by electromagnet 15 and having a cooperating driver contact 16 cooperating with it as well as two opposite side contacts 17 and 18. The reed structure may be similar to that shown and described in Musser Patent No. 2,207,300, or any other suitable structure.

Vibrator 11 comprises a vibratory reed 19 driven by electromagnet 20 which is connected in parallel with magnet 15 of vibrator 10 and has side contacts 21 and 22 cooperating with the reed on opposite sides. This vibrator may, for example, be of the type shown and described in Slater Patent No. 2,190,685 or Brown Patent No. 2,197,607.

A transformer 23 is associated with vibrator 10 and a transformer 24 with vibrator 11. Each transformer comprises a primary winding having a center tap, both the center taps being connected to the same terminal of battery 12. The ends of the primary of transformer 23 are connected respectively to contacts 17 and 18 of vibrator 10 and the ends of the primary of transformer 24 to contacts 21 and 22 of vibrator 11. One terminal of the secondary winding of each transformer is connected to common output terminal 13a. The other terminal of transformer 23 secondary is connected to output terminal 13 and that of transformer 24 secondary to terminal 13b.

Driver contact 16 of vibrator 10 is connected to one end of the windings of both vibrator electromagnets 15 and 20, the other ends of said magnet windings being connected through conductor 9 to the terminal of battery 12 to which the center taps of the primary windings are connected. The other terminal of battery 12 is connected to reeds 14 and 19. A resistance 25 is shunted across contacts 14, 16 as an arc suppressor.

It is obvious that vibrator magnet windings 15 and 20 can be connected in series, if desired.

In the operation of the circuit, when the battery is first connected current from the battery passes through reed 14 and normally-closed driver contact 16 to electromagnets 15 and 20 and returns to the battery through lead 9, thereby energizing the electromagnets. This initiates vibration of the reeds drawing the reeds to the left as shown in Figure 1. Reed 14 closes with contact 17 to connect battery current through the left hand half of transformer 23 primary winding. The swing of reed 14 to the left opens driver contact 16 thereby de-energizing the electromagnets and permitting the reeds to swing back when their energy has been spent.

On its return reed 14 closes with contact 18 to connect the battery to the opposite end of the primary transformer winding thereby reversing the current in the transformer. After spending its energy reed 14 swings again to the left and the cycle is repeated, the continued repetition generating an alternating voltage across the secondary winding.

During the operation of vibrator 10 the electromagnet 20 of vibrator 11 is energized in synchronism with electromagnet 15 of vibrator 10. However, reed 19 is found to operate 90° out of phase with reed 14 so as to close contact 21 one fourth cycle before reed 14 has closed contact 17 and similarly for contact 22 with respect to contact 18. This renders the output of transformer 24 90° out of phase with that of transformer 23 and provides the two phase output from the circuit.

The 90° phase difference between the vibrators may be explained as follows:

The driving vibrator being self-actuated, maintains a reed motion in a fixed relationship with the coil voltage. However the driven vibrator having a resonant frequency greater than the coil voltage frequency has a reed motion which leads this coil voltage just as a current in an LC circuit will lead the applied voltage when the resonant frequency of the circuit is greater than that of the applied voltage. Since non-sinusoidal and discontinuous waves are involved, a mathematical and quantitative analysis is for practical purposes impossible.

Figure 3:
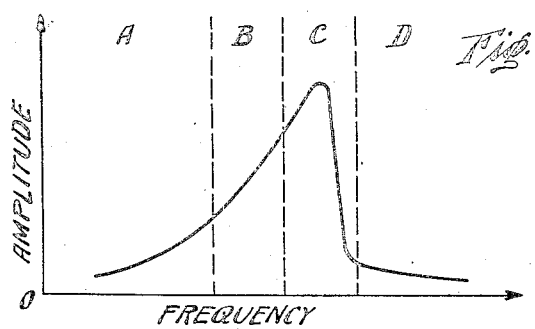
Figure 3 is a graph illustrating the performance of a vibrator.

In order to obtain satisfactory operation the natural period of the vibrators must be taken into consideration. If driven vibrator 11 was to be driven at various frequencies by energizing its magnet 20 with pulsating current of varied frequencies, the amplitude of the reed would increase as the frequency is increased up to a certain point, after which it would rapidly drop off as illustrated in the curve of Figure 3 wherein reed amplitude is plotted versus exciting frequency. The asymmetrical shape of the curve is due to the presence of non-linear compliances, magnetic forces and other factors in the structure of the vibrator.

In operation of the circuits of the present invention the driving vibrator will operate at its natural frequency, but this frequency will vary somewhat with variations in voltage, temperature, and other factors. Moreover, in the quantity production of vibrators certain variations in frequency will be encountered with different units of the same design. Therefore, the frequency of the driving vibrator 10 will be subject to some variation. Where the curve of Figure 3 represents the characteristics of the driven vibrator 11, the use of a driving vibrator 10 having a frequency in range A or range D is impracticable due to the excessive input currents required in the electromagnet winding 20 in order to obtain sufficient reed amplitude in the driven vibrator.

Operation in frequency range C produces unstable or unsteady operation due to the extreme variation in amplitude of the driven vibrator reed with slight variations in frequency which may occur thus resulting in what may be termed "motor boating" effect in the operation of the vibrator due to slight shifts in the frequency of the driving or driven vibrator.

It is proposed, therefore, to operate in range B. In other words, the highest natural frequency of the driving vibrator under varying conditions of voltage, temperature and vibrator adjustment must be less than the lowest natural frequency which the driven vibrator will have under any conditions. The frequency of the driving vibrator should, however, be greater than the frequency at which the driven vibrator amplitude is so low as to give erratic operation of the vibrator contacts. The amplitude of the driven vibrator must exceed that which is just sufficient to effect periodic contact closure.

By way of example, a driven vibrator having a natural frequency of 112 to 116 cycles per second when self-actuated can be satisfactorily driven by a driving vibrator operating at a natural period of 105 cycles per second. The driven vibrator will run at 105 cycles per second under these conditions but with a 90° phase shift.

Figure 2:
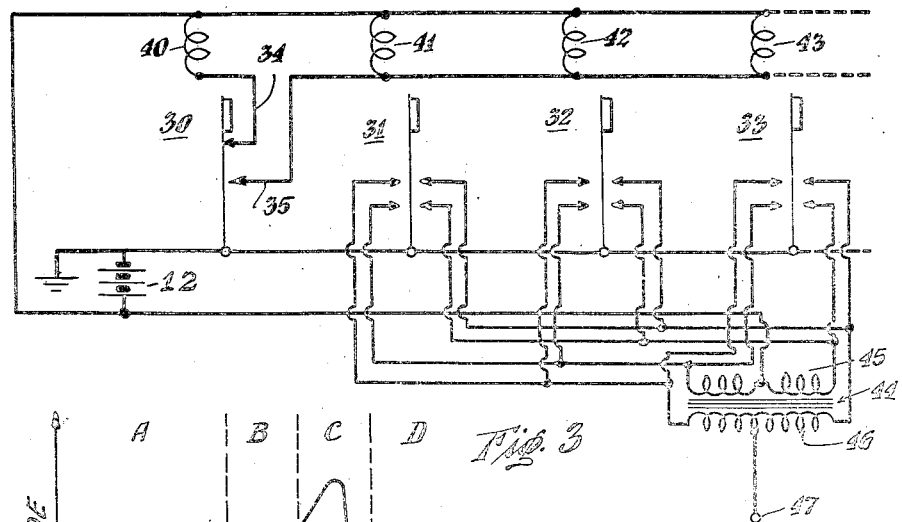
Figure 2 illustrates another circuit.

Figure 2 illustrates a modified circuit wherein a plurality of driven vibrators 31, 32, 33, etc., are controlled by a single driving vibrator 30. In this circuit driver contact 34 of vibrator 30 controls only electromagnet 40 of this vibrator. The electromagnets 41, 42, 43, etc., of vibrators 31, 32, 33, etc., are all connected in parallel to side contact 35 of vibrator 30 which is closed periodically during the vibration of the reed. Vibrators 31, 32 and 33 will operate in synchronism. The figure shows one circuit arrangement in which they may be utilized. In this circuit a step-up transformer 44 has a center-tapped primary 45 and a center-tapped secondary 46. The center of primary 45 is connected to a terminal of battery 12 and the two ends of this winding are connected respectively to opposite side contacts on vibrators 31, 32, and 33 in parallel. The ends of secondary 46 are connected respectively to a second set of opposite side contacts on the vibrators while the center tap is connected to the high voltage output terminal 47. Parallel operation of the three vibrators is thereby effected to obtain high current capacity.

While specific embodiments of the invention have been described, it is intended to cover the invention broadly within the spirit and scope of the appended claims.

What is claimed is:

1. A vibrator system comprising a driving vibrator, a driven vibrator, and a source of electric current, said driving vibrator comprising a vibratory reed and an electromagnet for driving said reed, contact means operated by said reed to control the energization of said electromagnet from said current source, whereby said electromagnet is periodically energized at the frequency of reed vibration to maintain said reed in vibration, said driven vibrator comprising a vibratory reed and an electromagnet for driving said reed, said contact means of said driving vibrator also controlling the energization of said driven vibrator electromagnet, the natural frequencies of said driving and driven vibrators each varying over a range of values, the maximum natural frequency of said driving vibrator being less than the minimum natural frequency of said driven vibrator but greater than the frequency at which the driven vibrator has an amplitude of response just sufficient to effect periodic contact closure.

2. A vibrator system comprising a driving vibrator, a driven vibrator having a higher natural frequency than said driving vibrator, a source of electric current and a first and second transformer, said driving vibrator comprising a reed, an electromagnet for driving said reed and contacts co-operating with said reed for periodically energizing said electromagnet in synchronism with the vibrations of said reed and for periodically reversing the connection of said current source to the primary of said first transformer for generating an alternating voltage across said transformer's secondary, said driven vibrator comprising a reed, an electromagnet for driving said reed energized periodically by said driving vibrator contacts in synchronism with vibrations of said driving vibrator reed, and contacts co-operating with said reed for periodically reversing the connection of said current source to the primary of said second transformer for generating an alternating voltage across said transformer's secondary.

3. The system of claim 2 wherein said driven vibrator operates 90 degrees out of phase with said driving vibrator and one terminal of each transformer secondary winding is connected to a common output terminal, the other terminals being connected to separate output terminals, to provide a two-phase output circuit.

4. A vibrator system which comprises in combination a driving and a driven vibrator each including a vibratory reed and a driver electromagnet, and contact means operable by the reed of said driving vibrator to periodically and substantially simultaneously energize said electromagnets from a source of current thereby to maintain said reeds in vibration, said driving vibrator having a lower natural frequency than that of said driven vibrator whereby said reeds will vibrate at identical frequencies but in out-of-phase relation.

5. A vibrator system which comprises in combination a driving and a driven vibrator each including a vibratory reed and a driver electromagnet, and contact means operable by the reed of said driving vibrator to periodically and simultaneously energize both electromagnets from a source of current substantially at the frequency of vibration of said reed and thereby maintaining both reeds in vibration, said driving vibrator having a lower natural frequency than said driven vibrator whereby said reeds will vibrate at identical frequencies but with a phase difference of about 90 degrees.

6. A vibrator system which comprises in combination a driving and a driven vibrator the natural frequencies of which may vary over a range of values, each including a vibratory reed and a driver electromagnet, and driver contact means under the control of the reed of said driving vibrator to periodically and simultaneously energize both electromagnets from a source of current substantially at the frequency of vibration of said reed thereby maintaining both reeds in continuous vibration, said driving vibrator having a lower maximum natural frequency than the minimum natural frequency of said driven vibrator whereby said reeds will vibrate at identical frequencies and the vibrations of the reed of the driven vibrator will lead those of the reed of the driving vibrator by about 90 degrees.

7. A vibrator system which comprises in combination a driving and a driven vibrator each including a vibratory reed and a driver electromagnet, driver contact means operable by the reed of said driving vibrator to periodically and simultaneously energize both electromagnets from a source of current substantially at the frequency of vibration of said reed and thereby maintaining both reeds in vibration, said driving vibrator having a lower natural frequency than said driven vibrator whereby said reeds will vibrate at identical frequencies but with a phase difference of about 90 degrees, a transformer for each of said vibrators, interrupter contact means for each of said vibrators to control the current flowing through the primary winding of the corresponding transformer, and connections between the secondary windings of said transformers to withdraw two-phase alternating current from the system.

8. A vibratory system which comprises in combination a driving and a driven vibrator each including a vibratory reed and a driver electromagnet, driver contact means operable by the reed of said driving vibrator to periodically and simultaneously energize both electromagnets from a source of current substantially at the frequency of vibration of said reed and thereby maintaining both reeds in vibration, a transformer for each of said vibrators, a set of interrupter contacts for each of said vibrators operable by the reed thereof to alternately pass current from said source in opposite directions through the primary winding of the corresponding transformer, said driving vibrator having a lower natural frequency than said driven vibrator whereby said sets of interrupter contacts will be operated at identical frequencies but with a phase difference of about 90 degrees, and a two-phase three-terminal output circuit having two of its terminals respectively connected to one end of the secondary winding of said transformers and having its third terminal connected to the other end of the secondary windings of said transformers.

9. A vibratory system which comprises in combination a driving vibrator and a plurality of driven vibrators each including a vibratory reed and a driver electromagnet, driver contact means operable by the reed of said driving vibrator to periodically and simultaneously energize said electromagnets from a source of current thereby to maintain said reed in vibration, interrupter contact means for each of said driven vibrators synchronously operable by the reeds thereof, and conductors for connecting said interrupter contact means in parallel thereby to control currents of increased intensity in a single circuit.

10. A vibrator system which comprises in combination a driving vibrator and a plurality of driven vibrators each including a vibratory reed and a driver electromagnet, contact means operable by the reed of said driving vibrator to periodically and simultaneously energize the electromagnets of said driven vibrators from a source of current thereby to maintain said reeds in vibration, the natural frequency of said driving vibrator being lower than that of said driven vibrators whereby the reeds of said driven vibrators will vibrate synchronously with each other but in out-of-phase relation with respect to the reed of said driving vibrator, interrupter contact means for each of said driven vibrators, and connections for electrically connecting said interrupter contact means in parallel thereby to permit controlling substantial amounts of current in a single circuit.

11. A vibrator system which comprises in combination a driving vibrator and a plurality of driven vibrators each including a vibratory reed and a driver electromagnet, contact means operable by the reed of said driving vibrator to periodically and simultaneously energize the electromagnets of said driven vibrators from a source of current thereby to maintain their reeds in vibration, interrupter and rectifier contacts for each of said driven vibrators synchronously operable by the reeds thereof and respectively connected in parallel to constitute contact groups, and a transformer in common for said driven vibrators having its primary circuit energized from said source under the control of said group of interrupter contacts and having its secondary circuit controlled by said group of rectifier contacts.

12. A vibrator system which comprises in combination a plurality of controlled vibrators of the self-rectifying type; each including a vibratory reed, interrupter and rectifier contacts for said reed, and a driver electromagnet; the interrupter and rectifier contacts of said vibrators being respectively connected in parallel to constitute contact groups; a step-up transformer in common for said groups having its primary winding electrically associated with a source of low-voltage direct current and with said group of interrupter contacts and having its secondary winding electrically associated with said group of rectifier contacts and an output circuit; and means including a controlling vibratory interrupter for periodically energizing said driver electromagnets and maintaining said reeds in synchronous vibration thereby producing high-voltage direct current of substantial intensity in said output circuit.

13. The system of claim 12 wherein the controlling vibratory interrupter has a natural frequency lower than that of the controlled self-rectifying vibrators.

CLARENCE HUETTEN.